United States Patent

Edwards

Patent Number: 5,755,176
Date of Patent: May 26, 1998

[54] BIRDS AND FURRED RODENTS FEEDING ENCLOSURE

[76] Inventor: Joe Edwards, Pavillon 3901 Conshohoken Ave., Philadelphia, Pa. 19131

[21] Appl. No.: 790,513

[22] Filed: Jan. 29, 1997

[51] Int. Cl.$^6$ .................. A01K 39/01; A01K 5/00
[52] U.S. Cl. ................ 119/51.01; 119/63; 119/437; 119/478
[58] Field of Search ............... 119/51.01, 59, 119/61, 63, 429, 435, 437, 441, 453, 459, 472, 478, 484, 487, 489, 490

[56] References Cited

U.S. PATENT DOCUMENTS

| 61,189 | 1/1867 | Clifford | 119/478 X |
|---|---|---|---|
| 1,180,032 | 4/1916 | Haldeman | 119/478 |
| 1,186,326 | 6/1916 | Moore | 119/437 |
| 1,203,865 | 11/1916 | Fair | 119/51.01 |
| 1,729,661 | 10/1929 | Leon | 119/459 X |
| 2,494,809 | 1/1950 | Henning | 119/61 |
| 3,114,350 | 12/1963 | King et al. | 119/51.01 |
| 3,626,468 | 12/1971 | Hanson | 119/63 X |
| 4,453,337 | 6/1984 | Williams | 43/131 |
| 5,133,291 | 7/1992 | Justice | 119/51.01 |

*Primary Examiner*—Gene Mancene
*Assistant Examiner*—Yvonne R. Abbott
*Attorney, Agent, or Firm*—Patent & Trademark Services; Thomas Zack; Joseph H. McGlynn

[57] ABSTRACT

A feed enclosure for birds and small creatures such as squirrels, raccoons or the like. A internal floor to ceiling enclosure partition prevents feeders from one side of the enclosure from entering into the feeding area entered from the other side. Small birds may enter from one side of the enclosure while larger birds and small creatures can feed from the other side. The larger birds may feed through an elevated opening by stretching their necks over a lower apron while the small creatures can enter into one of the two enclosed areas by one or more lower openings. Smaller birds enter the enclosure's other side through smaller spaced vertical partitions located over a lower wire mesh fence through which the small creatures are prevented from entering.

6 Claims, 1 Drawing Sheet

BIRDS AND FURRED RODENTS FEEDING ENCLOSURE

BACKGROUND OF THE INVENTION

The feeding of wild birds and other small animals, such as squirrels, raccoons and possums, has occurred for as long as one can remember. Bird houses and other pet structures have long been used by many persons in this process. Many have been elevated off the ground to take into consideration factors such as the creature's feeding habits and the desire to restrict the deposited food supply to a certain type of creature. The present invention relates to an enclosure whose construction and disposition was developed by observing and taking into consideration the feeding habits of different types of birds and furry creatures. The developed enclosure is ground mounted, light weight, portable, and easily adjustable to set it up or dismantle it when its need no longer exists. A partition within the enclosure and varying configured entrance openings permit only desired birds or furry creatures to enter specific areas while discouraging or restricting their entrance into other enclosure areas. Larger birds, such as geese and ducks, can feed in the same area reserved for furry creatures by standing outside the enclosure and stretching their necks over a lower ground engaging barrier. Thus, a versatile enclosure capable of providing a feeding place for our birds and furry creature friends is disclosed which takes into consideration their feeding habits and configurations.

DESCRIPTION OF THE PRIOR ART

Many different types of bird and animal feeding enclosures are known. For example, in U.S. Pat. No. 1,203,865 to Fair, a poultry feeder wire cage which is adjustable to restrict the entry to fowls under a certain size is disclosed.

In the U.S. Pat. No. 3,114,350 to King et al., an animal feeder for animal used in experiments having a hinged mobile grid over the feed.

Another feeder for rodents is described in U.S. Pat. No. 4,453,337 to Williams wherein covered entrance holes permit the rodent to travel to a opening offset from them and a bait cup.

A breakable screen confines bait pellets within the cup. And in U.S. Pat. No. 5,133,291 to Justice, a feeding station enclosure for cats and small animals is detailed having a small animal access opening with a top transparent trap to permit access to the food dish. The present invention differs from the known prior art by providing for a enclosure having at least one internal partition and restrictive entrances such that only small birds may feed in one internal area while furry creatures and larger birds can feed in another partitioned area as more further set forth in this specification.

SUMMARY OF THE INVENTION

This invention relates to a portable and light weight bird and furry creature feeding enclosure. An internal enclosure partition provides for a plurality of enclosed feeding areas whose entrance may be restricted by configuring the entrance openings by using either elevated openings or lower sized openings. Larger birds may feed in the same area as small furry creatures by stretching their necks over a ground engaging barrier.

It is the primary object of the present invention to provide for an improved apparatus for feeding birds and furry creatures.

Another object is to provide for such a feeder wherein smaller birds feed in one enclosed area while larger birds and furry creatures feed in another enclosed area.

These and other objects and advantages of the present invention will become apparent to readers from a consideration of the ensuing description and the accompanying drawings.

DESCRIPTION OF THE PREFERRED EMBODIMENT

Figure 1:
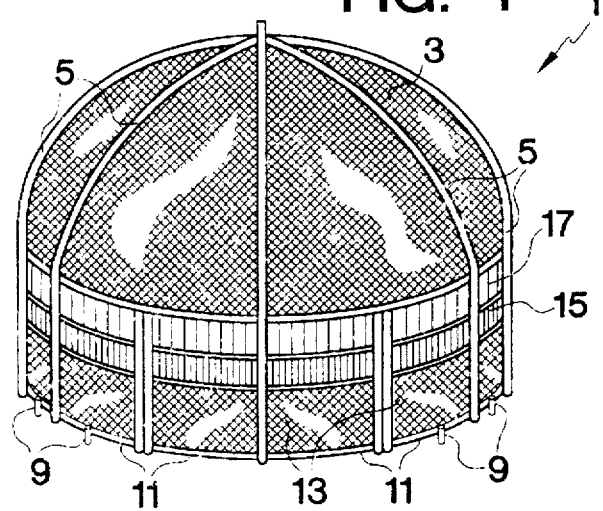
FIG. 1 is a front view of the ground assembled invention's preferred embodiment.
Figure 2:
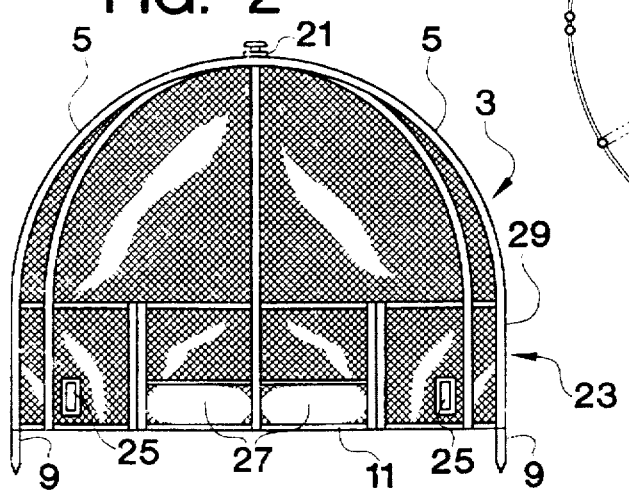
FIG. 2 is a side view of the FIG. 1 embodiment showing the lower entrances for furry creatures.

FIG. 1 is a front view of the ground assembled invention's preferred embodiment semi-spherical enclosure 1. This portable light weight enclosure is made up of an upper continuous canopy net 3 section supported vertically by a framework having a series of internal bent poles 5 and a lower sectionalized framework. This lower framework supports the outer lower partition 7. The partition 7 has two distinct different joined sectional configurations. One is as shown in FIG. 1 for small birds and the other is as shown in FIG. 2 for furry creatures and larger birds. Both lower partitions are made up of several joined sections which are driven into the ground by pointed pikes or stakes 9. These members extending through outer loops forming part of the lower sections edges 11. In this embodiment the floor for the enclosure is formed by the ground.

The outer partition sections for small birds have a lower wire fence portion 13 which extends from the ground upward several feet and continuous around the enclosure until it joins with the outer partition area for larger birds and furry creatures. Above the portions 13 and between it and the upper canopy net 3 are a series of opened vertical partitions 15 which permit birds below a certain size to enter the enclosure. These vertical partitions or bird entrances may be further restricted by having larger opening 17 on top and smaller or closer vertical partitions 19 on the bottom.

FIG. 2 is a side view of the FIG. 1 embodiment showing the lower entrances for furry creatures. This sectionalized side would be located on the opposite side of the enclosure from that of the FIG. 1 sections and be joined thereto on its two engaging side edges to form the total enclosure 1. Like the FIG. 1 side, this side has a continuous an upper canopy net 3 which is fastened to bent poles 5 and extends from the enclosure's apex 21 to where it joins with a lower outer wire fence sectionalized partition 23. This lower outer partition has one or more awning covered openings 25 located near or at ground level to permit small furry creatures such as squirrels, raccoons, possums, etc., to enter and leave one of the partitioned areas of the enclosure. Stakes 9 also hold this side's sections to the ground by engaging through loops attached to the framework's lower horizontal section edges 11. Between the two openings 25 is a pair of larger openings 27 which communicate with one of the enclosure's interior areas. The wire fence 29 forms a continuous lower enclosure barrier to the entrance of any furry creatures and birds except for its opened exits 25 and 27. The dimensions and material chosen for the wire mesh 29 should be such that it is resistant to climbing and penetration by the small creatures while not high enough to not be jumped over by them. Thus, the joined sections forming the FIG. 2 side allow small creatures to enter the enclosure and larger birds (e.g., geese or ducks) to feed from the enclosure's inside while stretching their necks through the openings 27 to obtain feed placed in one of the enclosure's internal areas.

Figure 3:
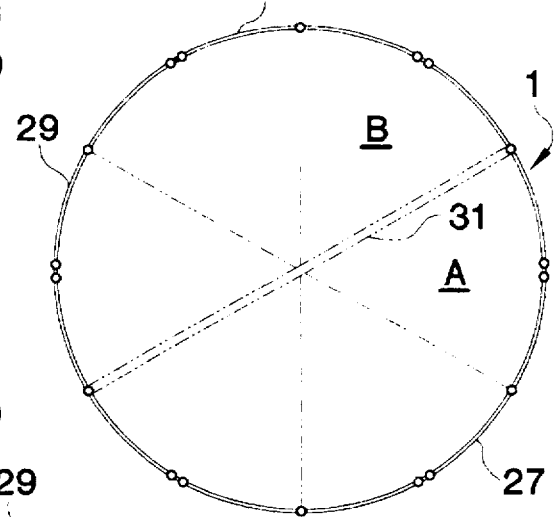
FIG. 3 shows a top cross sectional view, taken along line A—A of FIG. 2 looking down in the direction of the arrow, of the enclosure's internal partitioned feeding areas.

FIG. 3 shows a top cross sectional view, taken along line A—A of FIG. 2 looking down in the direction of the arrow, of the enclosure's internal two partitioned feeding areas. A floor to apex internal net partition 31 bisects the enclosure and its circular floor area and divides it into two distinct internal partition feeding areas A and B. The smaller birds entering through the FIG. 1 vertical opened partitions 15 would be able to feed from the feed deposited in the area A while the larger birds (ducks, geese, etc.) and other small creatures gaining access from through the openings in FIG. 2 would feed in area B. Both areas are mutually distinct and separated feeding areas thus, insuring that larger birds and small creatures will not consume the feed left for the smaller birds in separated feeding area A.

Figure 4:
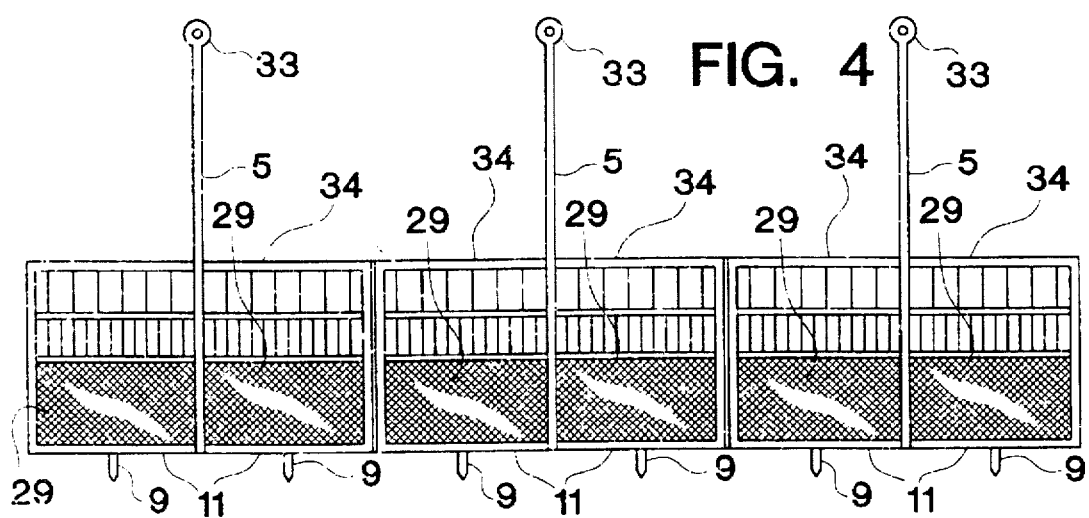
FIG. 4 shows three of the FIG. I smaller bird enclosures sections before they are assembled.

FIG. 4 shows three of the FIG. 1 smaller bird enclosures sections before they are assembled together to form part of the enclosure. These depicted three sections would enclose one side of the enclosure at its lower portion. One pliable bendable pole 5 forming the internal structural framework support on which the canopy net 3 is tied or otherwise fastened to, is attached to one lower section having two lower parts of wire mesh 29 and two ground engaging stakes 9. The outer frames, including the lower edges 11 and upper edges 34, are made of a light weight bendable, water resistant, and strong material, such plastic or aluminum, which can be curved in an arcuate shape. They, of course, could be injected molded into this shape or any other shape, including straight edges, as long as their joined edges can form part of an enclosure. Located on the top of the poles 5 are looped openings 33 which permit the different sections from both sides to be fastened by string or the like at the enclosure's apex 21 to join all sections together teepee style. In one embodiment six such sections (three as in FIG. 1 or 4 and three as in FIG. 2) are so joined to form the complete enclosure 1.

The terms "furry or small" creatures include not only the mentioned ones such as squirrels, raccoons and possums, but any small wild mammals fed by persons depending on the user's particular surrounding environment. Clearly, the size and configuration of the enclosure openings 25 will dictate the size of the small creatures which can enter to feed.

Further, possible modifications to the FIG. 1 enclosure 1 embodiment include providing it with a solid floor, rather than using the ground as its floor, that is configured in the shape of the enclosure's lower edge be it a circle, rectangle, square, etc., and joining the lower edge enclosure edges to it.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A portable feeding enclosure for birds and small creatures comprising:

structural supporting enclosure framework having upper and lower ends;

an upper canopy extending around the upper part of said framework and attached thereto to form a substantially continuous upper enclosure surface;

a first lower portion extending partially around the enclosure and adapted to be attached to the lower part of said framework, said first portion having a substantially continuous lower barrier to birds and small creatures and an upper opened partitioned area by which small birds may gain access to the interior of the enclosure;

a second lower portion extending partially around the enclosure and adapted to be attached to the lower part of said framework and said first portion at its joining edges, said second portion having at least one opening near its lower side through which small creatures may enter and a larger opening through which birds larger than those which can enter through said first portion can feed from inside the enclosure; and an internal partition to separate the enclosure's interior into two distinct feeding areas one for birds that enter through said first portion and another for larger birds having access through the second portion.

2. The invention as claimed in claim 1, wherein said framework is made of different sections having pliable members, said sections being joinable together to form the enclosure's framework.

3. The invention as claimed in claim 2, wherein both said first and second portions each have mesh barriers to birds and small creatures which extend substantially around the enclosure at its lower side.

4. The invention as claimed in claim 3, wherein said framework has lower members which can mount ground engaging members to attach the enclosure to the ground.

5. The invention as claimed in claim 4, wherein said enclosure is made of a light weight moisture resistant material.

6. The invention as claimed in claim 5, said second portion's larger opening is formed in by an apron which extends substantially to the ground, said opening providing a feeding entrance through which birds larger than those which can enter through said first portion can feed over its edge while remaining on the ground outside the enclosure.

* * * * *